United States Patent Office 3,425,973
Patented Feb. 4, 1969

3,425,973
COATING COMPOSITION BASED ON AROMATIC DIISOCYANATES, POLYOLS, AND MONOHYDRIC ALCOHOLS
Fred D. Shaw, Jr., Newark, Del., assignor to E. I. du Pont de Nemours and Company, Wilmington, Del., a corporation of Delaware
No Drawing. Filed Aug. 9, 1963, Ser. No. 301,203
U.S. Cl. 260—18     7 Claims
Int. Cl. C08g 22/08

ABSTRACT OF THE DISCLOSURE

A moisture-cure, one-package, fast-drying, polyurethane coating composition, prepared by reacting an aromatic diisocyanate, a polyol component, at least part of which is a triol, and a monohydric alcohol.

This invention relates to a novel moisture-cure polyurethane composition and particularly to moisture-cure polyurethane coating compositions.

One-package, moisture-cure polyurethane coating compositions produce finishes which possess exceptional resistance to abrasion and good weather resistance. These compositions can be compounded to produce films which range from relatively hard materials to those exhibiting a high degree of flexibility. Acceptance of these coatings for certain potential applications has been delayed because the drying time cannot be conveniently reduced. For example, flexible films derived from moisture-cure polyurethane coating compositions are ideal for coating elastomeric substrates, but long dry times, ranging up to 8–16 hours, often make their use impractical. As a further example, high-volume markets, such as prefinished flooring, require coatings that dry in minutes.

Catalysts have been suggested for reducing the time required for drying moisture-cure polyurethane coatings. Tertiary amines are exemplary of such catalysts and dry times can be reduced significantly by their use. However, in order to prevent premature gelling, these catalysts cannot be added to the coating composition until just prior to use. This necessitates a two-package system. In addition, the working life of the coating composition is reduced to a matter of hours once the catalyst has been added. These complications make the use of catalysts inconvenient.

It is an object of this invention to provide a novel one-package polyurethane coating composition. A further object is to provide a one-package polyurethane coating composition that has a faster drying time than those presently available. Other objects will appear hereinafter.

These and other objects are accomplished by a polyurethane composition in an inert solvent which comprises the reaction product of (a) about 1.4 to 2.0 equivalents of an aromatic diisocyanate, (b) about 1.0 equivalent of a polyol component having a hydroxyl number of 100 to 600 and containing about 1.0 gram molecular weight of a triol per 300 to 1500 grams of polyol component and (c) up to 0.5 equivalent of a monohydric alcohol per equivalent of diisocyanate in excess of the hydroxyl groups furnished by the polyol.

A moisture-cure one-package polyurethane coating composition may be briefly dsecribed as the solution of the reaction product of an excess of an organic diisocyanate with a mixture of polyols selected to provide certain physical properties in the dry film. Curing or drying of these materials is believed to be due to the reaction of free isocyanato groups in the composition with atmospheric moisture.

In essence, the compositions of this invention represent products which may be formed by reacting a conventional moisture-cure one-package polyurethane coating composition with a monohydric alcohol supplied in an amount of up to 0.5 equivalent of alcohol per equivalent of the free isocyanato groups contained in the conventional coating composition. However, it should be noted that preparation of the novel compositions is not necessarily restricted to the order of additions suggested by this description. This description is furnished to relate the present invention to prior art polyurethane coatings.

The diisocyanate required for preparing the present compositions may be selected from any of the aromatic diisocyanates known to those skilled in the art. These include representative examples such as 2,4-tolylene diisocyanate, 2,6-tolylene diisocyanate, 1,3-phenylene diisocyanate, 1,5-naphthalene diisocyanate, 3,5-dichloro-2,4-tolylene diisocyanate, 4,4'-diisocyanato - diphenylmethane and 4,4'-diisocyanato-diphenyl. Of these diisocyanates, the tolylene diisocyanates and 4,4'-diisocyanato-diphenylmethane are preferred because they are readily available commercially.

The polyol component required for preparing the compositions of the present invention should have a hydroxyl number of about 100–600 and should contain 1 gram molecular weight of a triol for each 300–1500 grams of polyol component. The restrictions in regard to hydroxyl number and triol content are necessary to produce coatings which in their final cured state have useful degrees of hardness, extensibility and flexibility. The limitation on hydroxyl number controls the concentration of urethane groups in the coating, while the cross-link density, which is expressed in terms of the weight of polyol component which contains 1 gram mole of triol, controls the concentration of cross-links in the coating. In general, the greater the hydroxyl number and the cross-link density, the more brittle will be the ultimate cured film produced. Conversely, polyol components having low hydroxyl numbers and low cross-link densities, will lead to compositions yielding soft, highly extensible and flexible films. While polyol components having hydroxyl numbers at the extreme limits of the 100–600 range are useful on certain occasions, preferred compositions are derived from polyol components having hydroxyl numbers in the range of 200–500. Similarly, polyol components containing 1 gram molecular weight of triol for each 500–1300 grams are preferred, but polyol components containing 1 gram molecular weight of triol for each 300–1500 grams may be useful on occasion.

Usually the polyol component will comprise a triol and one or more diols. These must be selected to meet the conditions set out with reference to hydroxyl number and cross-link density. Representative diols which are of use in preparing the polyol component include ethylene glycol, 1,2-propylene glycol, 1,3-butanediol, 1,4-butanediol, pentanediol, neopentyl glycol, diethylene glycol and dihydroxy castor oil derivatives. The polyol component usually will contain a quantity of high molecular weight diol which may be supplied as a polyalkylene ether glycol or a polyester glycol. The more common polyalkylene ether glycols are polymers of alkylene oxides such as ethylene oxide, 1,2-propylene oxide butylene oxide and mixtures thereof and the polymers which can be formed by the acid catalyzed polymerization of tetrahydrofuran. The polyester glycols which are useful are generally prepared by reacting about equimolar proportions of a low molecular weight glycol and a low molecular weight dibasic acid, with the provision that glycol component is employed in slight excess to furnish terminal hydroxyl groups. Preferred low molecular weight glycols for preparing polyester glycols include ethylene glycol, propylene glycol, butanediol and diethylene glycol. Preferred acids for polyester glycol preparation include succinic, glutaric and adipic acids, with aromatic dibasic acids such as phthalic and terephthalic acids, being less desirable. Representative triols which are useful in preparing the polyol component include glycerine, trimethylolpropane, trimethylolethane, castor oil, 1,2,6-hexanetriol and polyoxypropylene adducts of glycerine, hexanetriol or trimethylolpropane.

Any monohydric alcohol having an aliphatic hydroxyl group may be used in preparing the compositions of the present invention. The alcohol may contain substituents which are inert toward isocyanato groups, such as aryl, alkoxy and aryloxy groups. Cycloaliphatic alcohols are also included. The alcohol may be primary, secondary or tertiary, but primary and secondary alcohols are preferred because of the relatively low reactivity of tertiary alcohols toward isocyanato groups. In general, lower aliphatic alcohols having 12 carbon atoms or less are preferred to alcohols having higher molecular weights. The higher molecular weight alcohols may be of use on limited occasions, but in addition to reducing the time required for drying, they tend to plasticize the coating film. Plasticizing a coating which is normally soft and flexible can produce films which are actually tacky. Of course, plasticizing a film which is too brittle initially may result in a coating which has more useful properties. Limited plasticizing effects may be evidenced with alcohols having 12 carbon atoms or less, but these effects diminish as the molecular weight of the alcohol decreases. Examples of suitable monohydric alcohols include methanol, ethanol, propanol-2, butanol-1, tertiary-butyl alcohol, hexanols, octanol-1, decyl alcohol, dodecyl alcohol, 2-phenylethanol, cyclohexanol, stearyl alcohol, 2-ethoxyethanol and diethylene glycol monoethyl ether.

A variety of solvents or solvent mixtures can be used with the coating compositions of this invention. The solvents selected must be inert toward isocyanato groups and should be essentially anhydrous. Preferred solvents include toluene, xylene, high-flash naphtha, 2-ethoxy-ethyl-acetate and the acetate ester of diethylene glycol monoethyl ether. These solvents are usually employed in amounts such that they comprise 40 to 80% by weight of the final coating composition.

The aromatic diisocyanate, polyol component and monohydric alcohol must be employed in the proportions previously set out. The aromatic diisocyanate and polyol component should be employed in amounts such that the ratio of isocyanato groups to hydroxyl groups ranges from 1.4:1 to 2.0:1. Compositions containing less than 1.4 equivalents of isocyanato groups per equivalent of hydroxyl group, usually form unstable solutions which gel on standing prior to use. If more than about 2.0 equivalents of diisocyanate are used per equivalent of hydroxyl groups contained in the polyol component, the composition will contain free diisocyanate which may be undesirable from the standpoint of toxicity.

The maximum quantity of monohydric alcohol which may be used in the compositions of the present invention is equivalent to half of the excess of isocyanato groups over and above those required to react with the hydroxyl groups of the polyol component. In other words, the monohydric alcohol may be employed in amounts chemically equivalent to half the difference between the equivalents of diisocyanate used and the equivalents of hydroxyl groups furnished by the polyol component. For example, if 2.0 equivalents of isocyanato groups are used with one equivalent of hydroxyl groups furnished by the polyol component then up to 0.5 equivalent of monohydric alcohol may be used. If, however, 1.4 equivalents of isocyanato groups are used with one equivalent of hydroxyl groups furnished by the polyol component, then the maximum quantity of monohydric alcohol which may be used is limited to 0.2 equivalent. While a significant reduction in drying time as measured by tack-free time for instance, is exhibited with amounts of monohydric alcohol in the range of 5–10% (0.025 to 0.05 equivalent of monohydric alcohol) of the maximum amount of alcohol which may be used, it is usually preferable to use 50–100% (0.25 to 0.5 equivalent of monohydric alcohol) of the allowable alcohol since these quantities reduce drying time to about a third to a twentieth of the value which would be obtained in the absence of any monohydric alcohol. The exact reduction in drying time relative to a corresponding conventional coating composition devoid of monohydric alcohol depends on the amount and the specific alcohol employed and the nature of the other ingredients involved. The manner in which drying time varies with the amount of monohydric alcohol will be further illustrated by the following examples.

The coating compositions of the present invention may be prepared by charging the solvents, polyol component and monohydric alcohol to a kettle and adding the diisocyanate as rapidly as possible without exceeding a temperature of about 80° C.; followed by heating at about 90° C. until the isocyanato group content of the mass drops to an essentially constant value. Conversely, diisocyanate and solvent may be placed in a kettle and the polyol component and monohydric alcohol may be added separately or as a mixture. Perhaps the most convenient procedure involves adding solvents and the polyol component to a kettle, drying by azeotropic distillation and then adding the diisocyanate. Up to this point, the procedure is essentially that used to prepare conventional polyurethane coatings. The addition of the monohydric alcohol, which should be anhydrous, can be made to the coating composition shortly before it is packed into moisture free, airtight containers. The reaction of the monohydric alcohol with a portion of the isocyanato groups of the coating composition will be completed in storage if it does not reach completion prior to packaging.

The coating compositions of the present invention may be applied by brushing, spraying or dipping. They form smooth coatings which dry tack-free in less time than conventional polyurethane coatings. These compositions can be used wherever conventional polyurethane coatings may be employed. The compositions of the present invention are somewhat more viscous than conventional compositions but this is an advantage since most conventional coatings are too thin.

The primary distinct advantage of this invention resides in the reduced drying time for these novel coatings. The drying time is reduced by approximately one half or more over the presently available moisture-cured polyurethane coating compositions.

Additives which normally are included in conventional polyurethane coatings may be incorporated into the coatings of the present invention. These include ultraviolet light absorbers, non-discoloring antioxidants, resins to improve flow characteristics and pigments.

The following examples will better illustrate the nature of the present invention; however, the invention is not intended to be limited to these examples. Parts are by weight unless otherwise indicated.

EXAMPLE 1

Coating Composition 1–A

An example of the polyol component for producing the relatively flexible coating can be made by mixing one mole of polypropylene ether glycol having a molecular weight of about 1000, 0.3 mole of butanediol-1,3 and 1.3 moles of trimethylolpropane. This mixture has an hydroxyl number of 303 and contains one gram mole of triol per 924 g.

The following ingredients are charged to a glass-lined kettle equipped with an agitator, a heating and cooling jacket and a condenser:

| | Parts |
|---|---|
| Polypropyleneether glycol | 203.0 |
| Butanediol-1,3 | 5.5 |
| Trimenthylolpropane | 35.3 |
| Xylene | 205.0 |
| 2-ethoxyethyl acetate | 205.0 |
| Benzene | 33.0 |

The kettle is swept with dry nitrogen to displace air, and the benezene, plus any water present, is removed by slow azeotropic distillation. The charge is then cooled to below 32° C. and about 166 parts of a mixture of tolylene diisocyanate isomers (80% 2,4-isomer; 20% 2,6-isomer) is added as rapidly as possible without allowing the temperature to exceed about 80° C. After the intial exothermic reaction subsides, following the addition of the diisocyanate, the reaction mass is heated to about 90° C. and maintained at that temperature for 3 hours. This product is cooled to room temperature and stored in dry, sealed containers until required for use. This product is representative of a conventional moisture-cure polyurethane coating composition which contains no monohydric alcohol and yields a relatively flexible coating. It contains about 50% solids by weight.

Coating Composition 1-B

About 0.5 part of anhydrous ethyl alcohol is added to 100 parts of Coating Composition 1-A. The mixture is allowed to set for two days at room temperature to ensure complete reaction of the ethanol after which the isocyanato group assay remains constant. This quantity of alcohol is equivalent to 15.4% of the free isocyanato group assay of Coating Composition 1-A and represents 30.8% of the maximum amount of alcohol which can be used in preparing the compositions of the present invention.

Coating Composition 1-C

About 1.0 part of anhydrous ethyl alcohol is added to 100 parts of Coating Composition 1-A. The mixture is allowed to set for 2 days at room temperature to ensure complete reaction of the monohydric alcohol. The quantity of alcohol is equivalent to 30.5% of the free isocyanato group assay of Composition 1-A and represents 61% of the maximum amount of alcohol which can be used in preparing the compositions of the present invention.

Drawn films of 3 mil wet thickness are prepared from Coating Compositions 1-A, 1-B and 1-C. Tack-free times are measured on the wet films by the Zapon method at 24° C. and 60% relative humidity. Sward hardness, tensile strength and elongation at break are measured on the dry films. The results obtained are tabulated below. Viscosity of the fluid coating compositions after one week of storage are also included.

| | Coating Composition | | |
|---|---|---|---|
| | 1-A | 1-B | 1-C |
| Tack-free time, hrs | 8.0-8.5 | 4.5 | 3.0 |
| Sward Hardness: | | | |
| After 5 ays | 32 | 40 | 34 |
| After 10 days | 32 | 26 | 32 |
| Tensile, p.s.i. | 5,475 | 4,800 | 3,700 |
| Elongation at break, percent | 130 | 150 | 170 |
| Viscosity, cps. at 25° C | 180 | 370 | 635 |

Essentially identical results are obtained if Coating Compositions 1-B and 1-C are prepared by adding the etyhl alcohol to the mixture of polyols and solvents after drying by azeotropic distillation, but prior to the addition of tolylene diisocyanate.

EXAMPLE 2

Coating Composition 2-A

A useful mixture for preparing a relatively hard coating composition consists of one mole polypropylene ether glycol having a molecular weight of about 1000, one mole of butanediol-1,3, and 2 moles of trimethylolpropane. This polyol component has an hydroxyl number of 413 and contains one gram mole of triol per 679 g.

The following ingredients are charged to a glass-lined kettle equipped with an agitator, heating and cooling jacket and a condenser:

| | Parts |
|---|---|
| Polypropyleneether glycol | 1000 |
| Butanediol-1,3 | 90 |
| Trimethylolpropane | 268 |
| 2-ethoxyethyl acetate | 2060 |
| Xylene | 2060 |
| Benzene | 345 |

The kettle is swept with dry nitrogen to displace air, and the benzene, plus any water present, is removed by slow azeotropic distillation. The charge is then cooled to below 32° C. and about 1392 parts of a mixture of tolylene diisocyanate isomers (80% 2,4-isomer; 20% 2,6-isomer) is added as rapidly as possible without allowing the temperature to exceed about 80° C. After the initial exothermic reaction subsides, following the addition of the diisocyanate, the reaction mass is heated to about 90° C. and maintained at that temperature for 3 hours. This product is cooled to room temperature and stored in dry, sealed containers until required for use. This product is representative of a conventional moisture-cure polyurethane coating composition which yields a relatively hard finish. It contains about 40% solids by weight.

Coating Composition 2-B

About 0.45 part of anhydrous ethyl alcohol is added to 100 parts of Coating Composition 2-A and the mixture is allowed to set at room temperature for 2 days to ensure complete reaction of the ethanol. This amount of alcohol is equivalent to 11.3% of the free isocyanato group assay of Composition 2-A and represents 22.6% of the maximum amount of monohydric alcohol which can be used in preparing the compositions of the present invention.

Coating Composition 2-C

About 2.0 parts of anhydrous ethyl alcohol is added to 100 parts of Coating Composition 2-A and the mixture is allowed to set at room temperature for 2 days to ensure complete reaction of the ethanol. This amount of alcohol is equivalent to 49.8% of the free isocyanato group assay of Composition 2-A and represents 99.6% of the maximum amount of monohydric alcohol which can be used in preparing the compositions of the present invention.

Drawn films of 3 mil wet thickness are prepared from Coating Compositions 2-A, 2-B, and 2-C. Tack-free times are measured on the wet films by the Zapon method at 24° C. and 60% relative humidity. Sward hardness, tensile strength and elongation at break are also measured on the dry films. The results are tabulated below.

| | Coating Composition | | |
|---|---|---|---|
| | 2-A | 2-B | 2-C |
| Tack-free time, minutes | 60 | 32 | 10 |
| Sward hardness: | | | |
| 5 days | 64 | 52 | 54 |
| 10 days | 44 | | |
| Tensile, p.s.i. | 5,300 | 5,025 | 3,150 |
| Elongation at break, percent | 50 | 40 | 80 |

EXAMPLE 3

A series of four coating compositions (3-A to 3-D) is prepared by adding increasing amounts of anhydrous octanol-1 to portions of Coating Composition 2-A, prepared in Example 2. After the additions are made, the samples are mixed and allowed to set for two days to ensure complete monohydric alcohol reaction and then tack-free time and physical properties are determined as in Example 2. Amounts of regents and properties are tabulated below. Data on Composition 2-A is included for comparison.

| | Coating Composition | | | | |
|---|---|---|---|---|---|
| | 2-A | 3-A | 3-B | 3-C | 3-D |
| Parts Coating Composition 2-A | 100 | 100 | 100 | 100 | 100 |
| Parts Octanol-1 | ------ | 1.0 | 1.28 | 2.56 | 4.0 |
| Percent of Maximum Alcohol for Compositions of this Invention | ------ | 17.6 | 23.0 | 46.0 | 70.8 |
| Tack-free time, Zapon, minutes | 60 | 13 | 20 | 19 | 3 |
| Sward Hardness: | | | | | |
| 5 days | 64 | 60 | 54 | 76 | 60 |
| 10 days | 44 | 42 | ------ | ------ | 52 |
| Tensile Strength, p.s.i. | 5,300 | 4,875 | 5,200 | 4,100 | 3,625 |
| Elongation at Break, Percent | 50 | 95 | 60 | 50 | 115 |

As many widely different embodiments of this invention may be made without departing from the spirit and scope thereof, it is to be understood that this invention is not limited to the specific embodiments thereof except as defined in the appended claims.

What is claimed is:

1. A moisture-cure, one-package, fast-drying polyurethane coating composition in an inert solvent which comprises the reaction product of (a) about 1.4 to 2.0 equivalents of an aromatic diisocyanate, (b) about 1.0 equivalent of a polyol component having a hydroxyl number of 100–600 and containing about 1.0 gram molecular weight of a triol per 300–1500 grams of polyol component, said triol being from the group consisting of glycerine, trimethylolpropane, trimethylolethane, castor oil, and 1,2,6-hexanetriol, and (c) from about 0.025 to 0.5 equivalent of a primary or secondary monohydric alcohol per equivalent of diisocyanate in excess of the hydroxyl groups furnished by said polyol, said alcohol being an aliphatic monohydric alcohol of up to about 12 carbon atoms, any substituents thereon being inert to isocyanato groups.

2. A polyurethane coating composition of claim 1 wherein said monohydric alcohol content ranges from about 0.25–0.5 equivalent per equivalent of said excess diisocyanate.

3. A moisture-cure, one-package, fast-drying polyurethane coating composition in an inert solvent which comprises the reaction product of (a) about 1.4–2.0 equivalents of an aromatic diisocyanate, (b) about 1.0 equivalent of a polyol component having a hydroxyl number of 200–500 and containing about 1.0 gram molecular weight of a triol per 500–1300 grams of polyol component, said triol being from the group consisting of glycerine, trimethylolpropane, trimethylolethane, castor oil, and 1,2,6-hexanetriol, and (c) from about 0.25–0.5 equivalent of a primary or secondary monohydric alcohol per equivalent of diisocyanate in excess of the hydroxyl groups furnished by said polyol, said alcohol being an aliphatic monohydric alcohol of up to about 12 carbon atoms, any substituents thereon being inert to isocyanato groups.

4. A polyurethane coating composition of claim 3 wherein said monohydric alcohol is a primary alcohol.

5. A polyurethane coating composition of claim 3 wherein said monohydric alcohol is a secondary alcohol.

6. A polyurethane composition of claim 4 wherein said monohydric alcohol is ethyl alcohol.

7. A polyurethane composition of claim 4 wherein said monohydric alcohol is octanol-1.

References Cited

UNITED STATES PATENTS

| | | | |
|---|---|---|---|
| 2,929,800 | 3/1960 | Hill | 260—77.5 |
| 3,268,488 | 8/1966 | Heiss | 260—77.5 |
| 3,274,160 | 9/1966 | Ellegast et al. | 260—77.4 |
| 3,294,713 | 12/1966 | Hudson | 260—2.5 |
| 2,865,896 | 12/1958 | Fekete | 260—78.3 |
| 2,926,157 | 2/1960 | Leclercq | 260—77.5 |
| 3,012,993 | 12/1961 | Rogan | 260—77.5 |
| 3,025,160 | 3/1962 | Bunge et al. | 96—1 |
| 3,042,725 | 7/1962 | Carter et al. | 260—615 |
| 3,061,470 | 10/1962 | Kuemmerer | 117—138.8 |
| 3,102,875 | 7/1963 | Heiss | 260—77.5 |
| 3,350,361 | 10/1967 | Chandley et al. | 260—77.5 |

FOREIGN PATENTS

| | | |
|---|---|---|
| 210,411 | 7/1957 | Australia. |
| 1,012,644 | 12/1965 | Great Britain. |
| 512,692 | 5/1955 | Canada. |
| 1,103,581 | 3/1961 | Germany. |
| 1,132,331 | 6/1962 | Germany. |
| 1,139,271 | 11/1962 | Germany. |

DONALD E. CZAJA, Primary Examiner.

H. S. COCKERHAM, Assistant Examiner.

U.S. Cl. X.R.

117—161; 260—75, 77.5